UNITED STATES PATENT OFFICE.

WILLIAM A. REYNOLDS AND BLAKE O. REYNOLDS, OF ASHEVILLE, NORTH CAROLINA, ASSIGNORS OF ONE-HALF TO PAUL H. REYNOLDS, OF ASHEVILLE, NORTH CAROLINA.

PROCESS OF MAKING CONCRETE PIPE AND TILE.

1,019,918.  Specification of Letters Patent.  Patented Mar. 12, 1912.

No Drawing.  Application filed July 19, 1911.  Serial No. 639,402.

*To all whom it may concern:*

Be it known that we, WILLIAM A. REYNOLDS and BLAKE O. REYNOLDS, citizens of the United States, residing at Asheville, in the county of Buncombe and State of North Carolina, have invented new and useful Improvements in the Process of Making Concrete Pipe and Tile, of which the following is a specification.

Our invention relates to an improved process of making concrete pipe, tile and similar products from a mixture which includes crushed stone, sand and cement, and pertains more particularly to that part of the process relating to the setting and hardening of the admixture after molding.

The principal objects of the invention are to provide a process which may be practiced with great economy and which will result in a product of better quality than is now obtained by the working of such process for like purposes of which we have knowledge, and a further object of our invention is to effect a radical saving in time for the production of said articles in finished condition for use when made of said ingredients.

To these ends, our invention consists essentially of the process hereinafter described and more particularly pointed out in the claims.

In working the process constituting our invention, a predetermined quantity of crushed stone, sand or similar silicious material and Portland cement, comprising about two thirds of crushed stone and sand in the preferred proportion to each other to make a compact mass, and one third of cement, are thoroughly intermingled with sufficient moisture to produce sufficient consistency to form a bond to mold the mass in forms, but not enough to properly saturate and hydrate the mass to effect the cohesion of the cement and other ingredients. The semi-plastic material thus prepared may now be molded in preferred forms for pipe, tile or other articles, and then conveyed into a steam and air-tight chamber, and the mold jackets removed. The steam chamber may be of any preferred design, the particular form of which comprises no part of this invention. The steam chamber is then tightly sealed, and steam admitted thereto from any suitable supply at low pressure of substantially less than one lb. The period of induration at low steam pressure continues for approximately five or six hours, during which the moisture in suspension and condensation permeates the pores of the molded forms and sets up the cohesive process of the cement. The pressure of the steam is then gradually increased to approximately one hundred pounds pressure at which it is held for approximately four hours, which compacts the mass and completes the setting and hardening action of the mixture, after which the chamber may be opened and the products removed for cooling and use.

In the manufacture of concrete products, thus described, a more regular and uniform bond is accomplished, with greater hardness and strength, and the result is accomplished at a great economy of time and labor.

Having thus described our invention, what we claim as new and desire to be secured by Letters Patent, is—

1. The process of producing concrete pipe or tile from a composition including crushed stone, sand and cement, consisting in incorporating and mixing the crushed stone, sand and cement, adding sufficient moisture to partially hydrate the composition and produce sufficient consistency for molding same into forms without effecting the cohesion of the mass, molding same, then subjecting the molded composition to the action of steam in confinement under low pressure for a sufficient period to permit the moisture in suspension to permeate the pores of the molded forms and set up the cohesive process of the cement, and thereafter gradually increasing the degree of steam pressure to approximately 100 pounds for a sufficient period to compact the forms and complete the setting and hardening action of the composition, substantially as described.

2. The process of producing concrete pipe or tile from a composition including crushed stone, sand and cement, consisting in incorporating and mixing the crushed stone, sand and cement, adding sufficient moisture to partially hydrate the composition and produce sufficient consistency for molding same into forms, without effecting the cohesion of the mass, molding same, then subjecting the molded composition to the action of steam in confinement under approximately one pound pressure for substantially five or six hours, by which the moisture in suspension permeates the pores of the molded forms and sets up the cohesive process of the cement, and thereafter gradually increasing the degree of steam pressure to approximately 100 pounds for a period of approximately four hours which compacts the forms and completes the setting and hardening action of the composition, substantially as described.

WILLIAM A. REYNOLDS.
BLAKE O. REYNOLDS.

Witnesses:
R. W. HAMMERSLOUGH,
E. J. RANDOLPH.